(12) United States Patent
Birken et al.

(10) Patent No.: US 6,525,539 B2
(45) Date of Patent: Feb. 25, 2003

(54) APPARATUS AND METHOD FOR LOCATING SUBSURFACE OBJECTS IN CONDUCTIVE SOILS BY MEASUREMENTS OF MAGNETIC FIELDS BY INDUCED CURRENTS WITH AN ARRAY OF MULTIPLE RECEIVERS

(75) Inventors: Ralf Birken, Boston, MA (US); Thorkild Hansen, Brighton, MA (US)

(73) Assignee: Witten Technologies Inc., Boston, MA (US)

( * ) Notice: Subject to any disclaimer, the term of this patent is extended or adjusted under 35 U.S.C. 154(b) by 0 days.

(21) Appl. No.: 09/808,976

(22) Filed: Mar. 15, 2001

(65) Prior Publication Data

US 2002/0130664 A1 Sep. 19, 2002

(51) Int. Cl.[7] .............................. G01V 3/08; G01V 3/10
(52) U.S. Cl. ......................................... 324/329; 324/326
(58) Field of Search ................................. 324/329, 233, 324/337, 326, 232, 234, 336, 334, 238, 339

(56) References Cited

U.S. PATENT DOCUMENTS

| | | | | | |
|---|---|---|---|---|---|
| 4,070,612 | A | * | 1/1978 | McNeill | 324/239 |
| 4,855,677 | A | * | 8/1989 | Clark, Jr. et al. | 324/238 |
| 5,231,355 | A | * | 7/1993 | Rider et al. | 324/326 |

* cited by examiner

*Primary Examiner*—Edward Lefkowitz
*Assistant Examiner*—Subhash Zaveri
(74) *Attorney, Agent, or Firm*—Fulbright & Jaworski L.L.P.

(57) ABSTRACT

An apparatus and method for locating subsurface objects using an induction array system is presented. The system uses a movable array that contains two or more spatially separated receivers and one or more spatially separated transmitters. The spatial separation permits the array to detect objects at varying depths with a single pass of the device over the surface area under investigation. If multiple transmitters are used, then they may either be operated simultaneously at different frequencies or sequentially at the same frequency. The spacing between receiver and transmitter elements in the induction array may be uniform or non-uniform.

21 Claims, 4 Drawing Sheets

APPARATUS AND METHOD FOR LOCATING SUBSURFACE OBJECTS IN CONDUCTIVE SOILS BY MEASUREMENTS OF MAGNETIC FIELDS BY INDUCED CURRENTS WITH AN ARRAY OF MULTIPLE RECEIVERS

FIELD OF THE INVENTION

This invention relates to a movable frequency-domain induction apparatus and method for use in locating subsurface objects.

BACKGROUND

It is important during excavation to have a precise map of the subsurface so as to avoid damaging existing utilities such as water, gas, and electric lines. For example, when new pipes are to be installed in a certain area, the location of any existing pipes in that area must be known to avoid damage to them when the trenches for the new pipes are being excavated. The lack of accurate subsurface maps for construction sites results in thousands of broken pipes and billions of dollars in repair costs each year.

Most currently used pipe location equipment requires an operator to connect a transmitter directly to the pipe. With this equipment, the attached transmitter injects a single-frequency current into the pipe at a location where the pipe is exposed. For example, with a water pipe the current may be injected at a fire hydrant. The resulting magnetic field on the surface is then measured with a single hand-held receiver that records one or several of the components of the magnetic field. If only a single straight pipe is present, the hand-held receiver can accurately determine the direction and depth of that pipe. However, the pipe must be exposed so that the transmitter can be connected. Unexposed pipes cannot be located using this equipment.

There are numerous obvious advantages to pipe location equipment that does not require an operator to directly connect a transmitter to the pipe. For example, such equipment would permit one to locate unexposed pipes and would not require any direct physical connection. Such pipe locating equipment generally relies on either induction or wave propagation. Wave propagation is used in ground penetrating radar. However, such wave propagation methods require the soil conductivity to be relatively low. When the soil conductivity is high, the radar waves attenuate rapidly and may fail to reach the subsurface regions that contain the pipes. By contrast, induction methods work well when the soil conductivity is high.

To understand why induction methods work well in situations where radar methods may fail, consider a plane wave that propagates in a homogeneous soil with permeability $\mu_0 = 1.256 \times 10^{-6}$ H/m, relative permittivity $\epsilon_r$, and conductivity $\sigma$. Assume that the plane wave is time harmonic with angular frequency $\omega = 2\pi f$. If the direction of propagation is the x axis, then the plane wave behaves as exp(ikx) where the propagation constant k is given by $(\omega^2 \mu_0 \epsilon_0 \epsilon_r + i \omega \mu_0 \sigma)^{1/2}$ with $\epsilon_0 = 8.85 \times 10^{-12}$ F/m. The decay of the plane wave is then given by exp(−Im(k)x), where Im(k) denotes the imaginary part of k. For typical soils, $\epsilon_r$ ranges from 2 to 30 and $\sigma$ ranges from $10^{-6}$ S/m to 1 S/m. To illustrate the difference between radar and induction methods, assume that the soil is wet clay for which $\epsilon_r = 10$ and $\sigma = 0.2$ S/m. Typical center frequencies for radar systems and induction systems are 400 MHz and 20 kHz, respectively. Using these values, it follows that the decay of the plane wave is exp(−(11.0/m)x) for the radar signal and exp(−(0.13/m)x) for the induction signal. Thus, for every meter of propagation the radar signal decays 95 dB whereas the induction signal decays 17 dB, and hence only the induction method could be used in such soil to locate pipes buried more than a few centimeters under the surface.

A wide variety of induction systems are commercially available. Each employs loop antennas, and they range in size from hand-held devices (such a simple metal detectors) to large systems, such as those used for mining applications, that have loop sizes on the order of hundreds of meters. These induction systems are designed primarily for the detection of conductive ores, aggregates, aquifers, bedrock, and buried waste.

One such commercially available system is the EM31 that is sold by Geonics Limited, which provides numerous induction tools for geophysical exploration. (The Geonics products are described in U.S. Pat. Nos. 4,070,612 and 4,199,720.) The EM31 is a handheld device that consists of a transmitter loop and a receiver loop separated a fixed distance from each other. The loops are small enough to be approximated by magnetic dipoles, and the tool can be operated in both vertical and horizontal dipole modes. However, since the EM31 has only a single receiver, it is cumbersome to use it to collect densely-sampled data over a large survey area. Further, only a single transmitter-receiver spacing (3.7 meters) is achieved with this tool.

Geonics also produces the EM34-4 system, which consists of transmitter and receiver coils and which can be operated at three operator-selected spacings. This variable spacing permits the device to be used at different exploration depths. However, to create a data set with more than one transmitter-receiver spacing with this device, one would have to repeat the survey with different coil separations. Further, with each pass, data is collected along only one line, which means that to cover a large area one must bring the device back and forth many times. Thus, the EM34-4 is not an efficient tool for collecting densely-sampled data for large survey areas.

SUMMARY OF THE INVENTION

The present invention provides a frequency-domain induction system that includes a movable array containing two or more spatially separated receiver array elements and one or more spatially separated transmitter array elements, transmission circuitry for transmitting time-harmonic electromagnetic fields over the transmitter array elements, and reception circuitry for detecting over the receiver array elements magnetic fields induced by the time-harmonic electromagnetic fields.

In one embodiment of the present invention, the movable array is attached to a movable cart. In another embodiment, the movable array contains an equal number of receiver array elements and transmitter array elements. In yet another embodiment, each of the receiver array elements is integrated with one of the transmitter array elements. In a further embodiment, each of the receiver array elements is spatially separated from each of the transmitter array elements.

In one embodiment of the present invention, the receiver array elements are collinear, and, in another embodiment, the transmitter array elements are collinear. In a further embodiment, the transmitter array elements and the receiver array elements are collinear.

In one embodiment of the present invention, the transmission circuitry simultaneously transmits time-harmonic electromagnetic fields having different frequencies. In another embodiment, the transmission circuitry sequentially transmits time-harmonic electromagnetic fields having the same frequency. In a further embodiment, the transmission circuitry transmits time-harmonic electromagnetic fields of at least two different frequencies and the reception circuitry detects each frequency over each receiver array element.

In one embodiment of the present invention, the spatially separated receiver array elements are uniformly spaced. In another embodiment, the spatially separated transmitter array elements are uniformly spaced.

The present invention also provides a method for detecting subsurface objects, comprising the step of providing a movable array containing two or more spatially separated receiver array elements and one or more spatially separated transmitter array elements, the step of transmitting time-harmonic electromagnetic fields over the transmitter array elements, the step of detecting over the receiver array elements magnetic fields induced by the time-harmonic electromagnetic fields, and the step of analyzing the magnetic fields to detect the presence of a subsurface object. One embodiment of the present invention includes the additional step of moving the movable array along a path above subsurface objects. In yet another embodiment, that path is a straight path.

In one embodiment of the present invention, the transmitting step further comprises simultaneously transmitting time-harmonic electromagnetic fields of different frequencies. In another embodiment, the transmitting step further comprises sequentially transmitting time-harmonic electromagnetic fields of the same frequency. In a further embodiment, the analyzing step detects the presence of a subsurface conducting object, and, in an additional embodiment, the analyzing step detects the presence of a subsurface non-conducting object.

The present invention further provides a frequency domain induction system for locating subsurface objects comprising a movable cart, an array attached to the movable cart and including two or more spatially separated receiver/transmitter pairs, transmission circuitry adapted to transmit time-harmonic electromagnetic fields through the transmitters, reception circuitry adapted to receive magnetic fields induced by the time-harmonic electromagnetic fields, and analysis software capable of analyzing the magnetic fields to detect the presence of subsurface objects.

DETAILED DESCRIPTION

Figure 1:
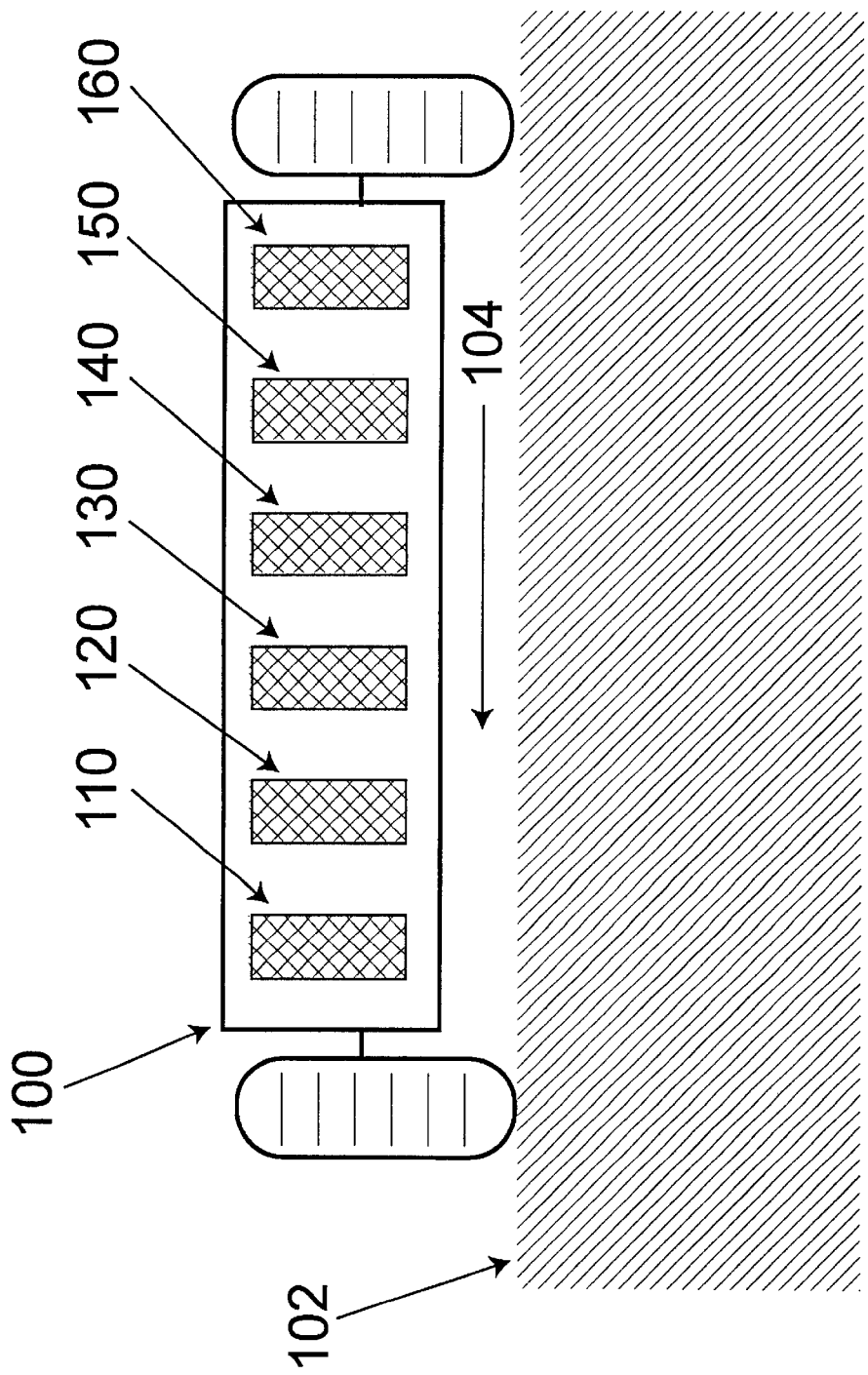
FIG. 1 is a side view of one embodiment of an induction array for use in the present invention.

The present invention overcomes the shortcomings discussed above by providing an array of transmitters and receivers by which varying transmitter-receiver spacings may be automatically achieved. Further, the number of survey lines collected in a single pass according to the present invention is equal to the number of transmitters multiplied by the number of receivers, which permits densely-sampled, multiple-offset data sets to be collected rapidly for large survey areas.

The depth of exploration obtained from an induction device depends on the orientation of the transmitters and receivers and on their spatial separation. For example, when the transmitters and receivers are small loop antennas parallel to the ground and separated by a distance d, the induction tool will be most sensitive to pipes that are buried at a depth of approximately 0.4 d. Accordingly, it is advantageous to be able to change the distance between the transmitters and receivers so that pipes of varying depths may be located. By providing an array of simultaneously operating transmitters and receivers, the present invention is able to produce a data set in a single pass that is based on multiple transmitter-receiver spacings. If the present invention is used with more than one transmitter, then those transmitters may either operate simultaneously at different frequencies or operate sequentially at the same frequency.

The present invention provides a frequency-domain induction tool for detecting pipes and cables that is preferably mounted on a movable cart. The disclosed apparatus consists of transmitters and receivers, as well as the electronic equipment required to operate the transmitters and receivers. The transmitters in the device create a time-harmonic electromagnetic field that induces eddy currents in the subsurface. The eddy currents emit a magnetic field, which is measured by the receivers. Eddy currents are most easily induced in regions with high conductivity and therefore tend to be concentrated along conducting pipes and absent from non-conducting pipes. Hence, conducting as well as non-conducting pipes disturb the magnetic field on the surface and thus can be detected by the present invention. That is, the present invention can be used to detect any object whose conductivity is significantly different from the conductivity of the surrounding soil. In particular, the present invention is capable of detecting both non-conducting and conducting pipes.

The receiver output may be separated into two components: the in-phase component and the quadrature-phase component. The in-phase component has the same phase as the transmitted field, and the quadrature-phase component is 90 degrees out of phase with the transmitted field. The direct field contributes to the in-phase component only, and thus only that component would be non-zero if the transmitters and receivers were operated in free space. The quadrature-phase component results from the interaction of the direct field with the soil and any objects that are buried in the soil. Hence, information about the buried objects is more easily obtainable from the quadrature-phase component. (The in-phase component also contains information about the buried objects, but that information is generally obscured by the strong contribution of the direct signal.)

The induction system of the present invention is preferably attached to a movable cart. As that cart is moved along the surface, a two-dimensional map is recorded of the magnetic field emitted by the eddy currents. This map reveals the location of pipes buried beneath the surface.

Figure 2:
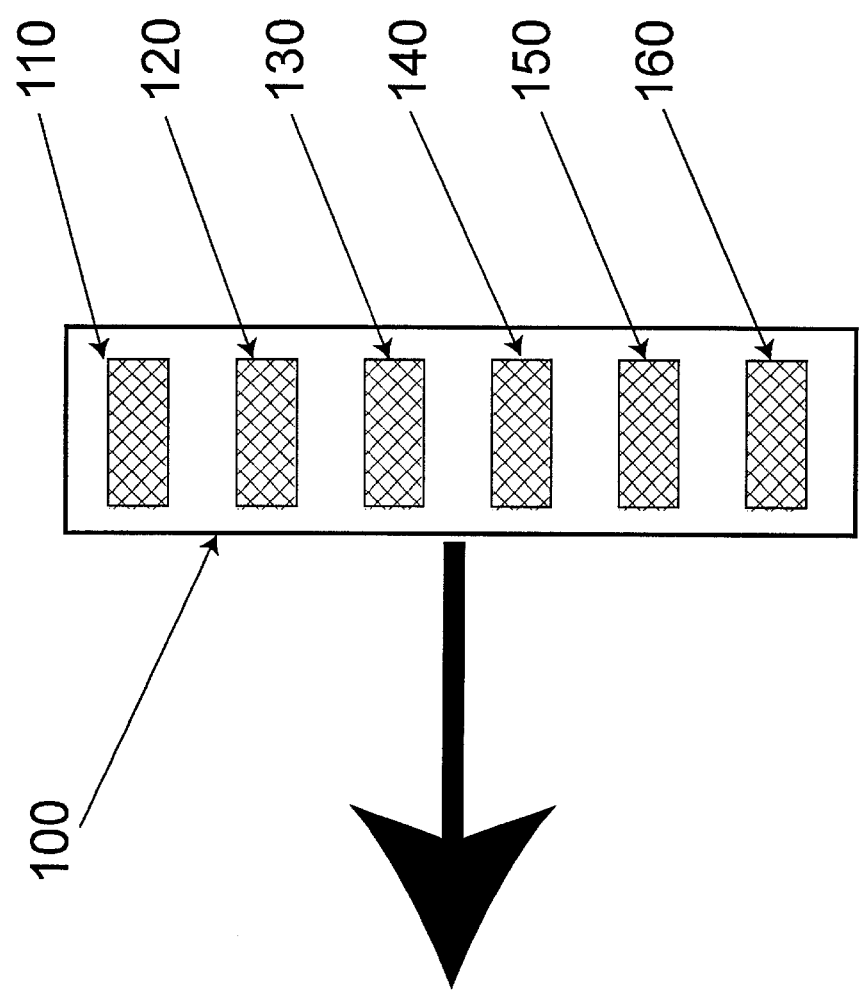
FIG. 2 is a top view of one embodiment of an induction array for use in the present invention.

FIG. 1 and FIG. 2 illustrate an embodiment of the present invention with array 100 contains six array elements (110, 120, 130, 140, 150, 160), each containing transmitters and receivers. Array 100 is shown in FIG. 1 in relation to the ground 102 and the air 104. The direction of motion for this particular embodiment is shown in FIG. 2. Each transmitter is driven with a separate frequency and each receiver records the magnetic field at all of the transmitter frequencies. The present invention permits multiple-offset induction measurements to be carried out simultaneously and the entire region covered by the swath of the array to be investigated.

Figure 3:
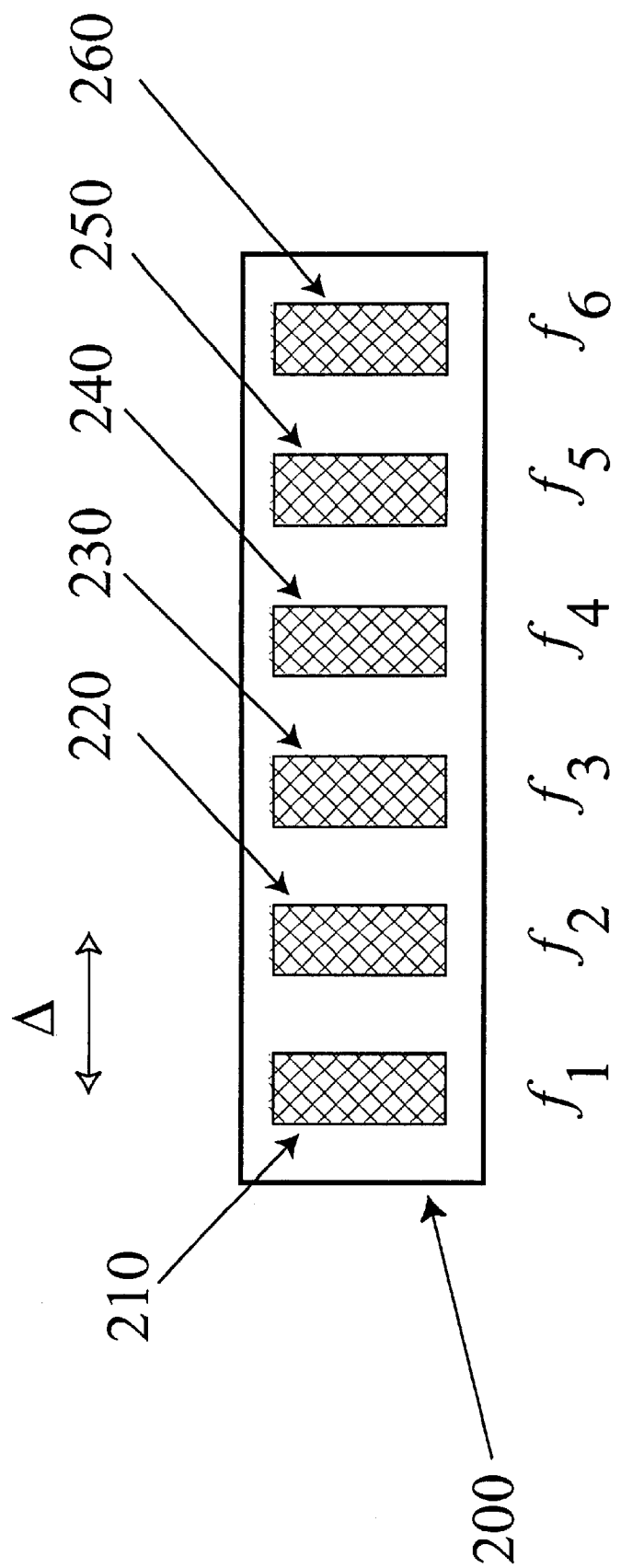
FIG. 3 is a top view of an embodiment of the present invention with six uniformly spaced array elements.

FIG. 3 illustrates an embodiment of the present invention in which array 200 consists of six uniformly spaced array elements (210, 220, 230, 240, 250, 260), each of which contains a single transmitter and a single receiver. The transmitters in array elements 210, 220, 230, 240, 250, and 260 operate at frequency $f_1, f_2, f_3, f_4, f_5,$ and $f_6$, respectively. The distance between adjacent array elements is $\Delta$, and the receivers record at all frequencies simultaneously. The output from the receiver in array element 210 consists of six time-harmonic signals at the frequencies $f_1, f_2, f_3, f_4, f_5,$ and $f_6$, and the horizontal transmitter-receiver offset corresponding to frequency $f_n$ is $(n-1)\Delta$ for n=1, 2, 3, 4, 5, and 6. In general, if the receivers are sequentially numbered 1 to 6, with receiver 1 being in array element 210 and receiver 6 being in array element 260, then, for receiver m, the horizontal transmitter-receiver offset corresponding to the frequency $f_n$ is $|n-m| \Delta$ for m=1, 2, 3, 4, 5, and 6 and n=1, 2, 3, 4, 5, and 6. As discussed above, each different transmitter-receiver spacing corresponds to a different depth of exploration. (When m=n the transmitter and the receiver are at the same horizontal position, i.e., one above the other.) For the configuration shown in FIG. 2, thirty six channels of data are collected simultaneously.

The embodiment illustrated in FIG. 2 may be generalized in numerous ways, as would be apparent to those of skill in the art. For example, the array may consist of any number (greater than one) of array elements. Further, three-component transmitters and receivers may be used in each array element to generate data for various orientations. In addition, each array element need not contain both transmitters and receivers. Instead, the transmitters and receivers may be located in different array elements. Each transmitter, however, would still operate at a different frequency to achieve simultaneous acquisition of all transmitted signals at all receivers. In addition, the array elements need not be collinear, but may instead, for example, be arranged so that the receivers are collinear and the transmitters are collinear but not so that the entire array is collinear. Further, the number of transmitters need not equal the number of receivers, and the spacing between array elements need not be uniform.

Typically, the receivers are arranged in groups of three for space considerations and so that all orthogonal magnetic field components in one location may be recorded. Further, the transmitters are typically arranged in groups of three for space considerations and so that all three components may be transmitted from the same location. However, the present invention is not limited to such configurations.

Figure 4:
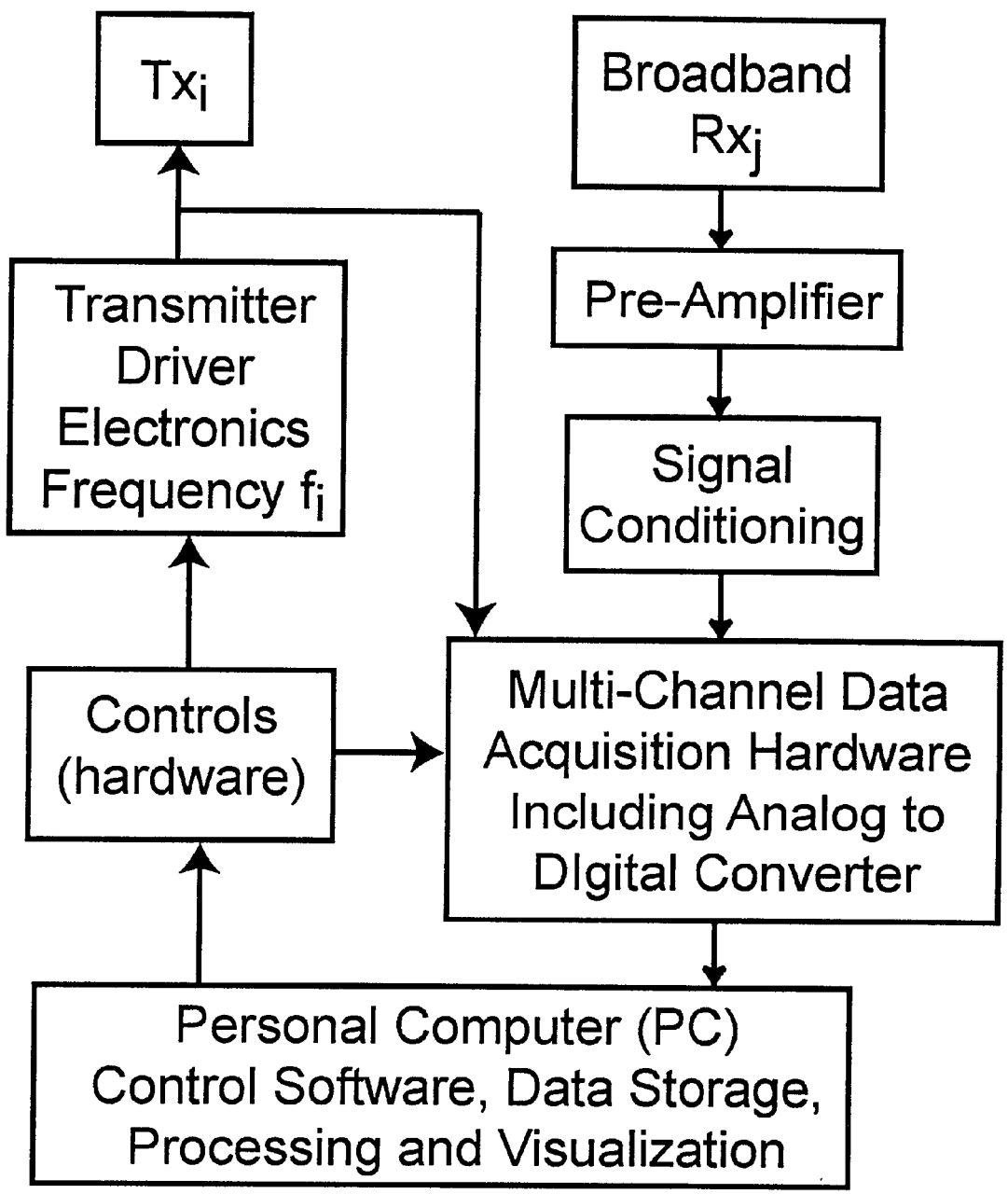
FIG. 4 is a flow diagram of an embodiment of the present invention illustrating the steps by which data is acquired by receiver j based on a transmitted signal from transmitter i.

The data acquisition system records the transmitted signals and received signals as time series. The difference in phase between the transmitted and received signal provides the required phase information. The final output of the system are generally frequency domain quantities. The receivers will typically be packaged with pre-amplifiers and will generally be sensitive to signals in the 500 Hz to 50 kHz range. Signal conditioning may be used as needed to provide gaining, attenuation, filtering, voltage range conversion, and other types of conditioning known to those of skill in the art. Controls may be implemented, for example, via physical switches or via digital lines from the data acquisition system or a general purpose computer. This general purpose computer may also be used to provide data storage, data processing, and data visualization. FIG. 4 shows a flow diagram of a particular embodiment of the present invention in which data is acquired by receiver j based on a transmitted signal from transmitter i.

The present invention, therefore, is well adapted to carry out the objects and obtain the ends and advantages mentioned above, as well as others inherent herein. All presently preferred embodiments of the invention have been given for the purposes of disclosure. Where in the foregoing description reference has been made to elements having known equivalents, then such equivalents are included as if they were individually set forth. Although the invention has been described by way of example and with reference to particular embodiments, it is not intended that this invention be limited to those particular examples and embodiments. It is to be understood that numerous modifications and/or improvements in detail of construction may be made that will readily suggest themselves to those skilled in the art and that are encompassed within the spirit of the invention and the scope of the appended claims.

I claim:

1. A frequency-domain induction system for locating subsurface objects comprising:

a movable vehicular array containing two or more spatially separated receiver array elements and one or more spatially separated transmitter array elements;

transmission circuitry for simultaneously or sequentially transmitting time-harmonic electromagnetic fields over said one or more transmitter array elements; and, reception circuitry for detecting over said two or more receiver array elements magnetic fields induced by said time-harmonic electromagnetic fields.

2. The frequency-domain induction system of claim 1, wherein said movable array further comprises a movable cart.

3. The frequency-domain induction system of claim 1, wherein said movable array contains an equal number of receiver array elements and transmitter array elements.

4. The frequency-domain induction system of claim 1, wherein each of said receiver array elements is integrated with one of said transmitter array elements.

5. The frequency-domain induction system of claim 1, wherein each of said two or more receiver array elements is spatially separated from each of said one or more transmitter array elements.

6. The frequency-domain induction system of claim 1, wherein said two or more receiver array elements are collinear.

7. The frequency-domain induction system of claim 1, wherein said one or more transmitter array elements are collinear.

8. The frequency-domain induction system of claim 1, wherein said one or more transmitter array elements and said two or more receiver array elements are collinear.

9. The frequency-domain induction system of claim 1, wherein said transmission circuitry simultaneously transmits time-harmonic electromagnetic fields having different frequencies.

10. The frequency-domain induction system of claim 1, wherein said transmission circuitry sequentially transmits time-harmonic electromagnetic fields having the same frequency.

11. The frequency-domain induction system of claim 1, wherein said transmission circuitry transmits time-harmonic electromagnetic fields of at least two different frequencies and said reception circuitry detects each said frequency over each said receiver array element.

12. The frequency-domain induction system of claim 1, wherein said spatially separated receiver array elements are uniformly spaced.

13. The frequency-domain induction system of claim 1, wherein said spatially separated transmitter array elements are uniformly spaced.

14. A method for detecting subsurface objects, comprising:
   (a) providing a movable array containing two or more spatially separated receiver array elements and one or more spatially separated transmitter array elements;
   (b) transmitting time-harmonic electromagnetic fields over said one or more transmitter array elements;
   (c) detecting over said two or more receiver array elements magnetic fields induced by said time-harmonic electromagnetic fields; and,
   (d) analyzing said magnetic fields to detect the presence of a subsurface object.

15. The method for detecting subsurface objects of claim 14, further comprising moving said movable array along a path above said subsurface objects.

16. The method for detecting subsurface objects of claim 14, wherein said path is a straight path.

17. The method for detecting subsurface objects of claim 14, wherein said transmitting step further comprises simultaneously transmitting time-harmonic electromagnetic fields of different frequencies.

18. The method for detecting subsurface objects of claim 14, wherein said transmitting step further comprises sequentially transmitting time-harmonic electromagnetic fields of the same frequency.

19. The method for detecting subsurface objects of claim 14, wherein said analyzing step detects the presence of a subsurface conducting object.

20. The method for detecting subsurface objects of claim 14, wherein said analyzing step detects the presence of a subsurface non-conducting object.

21. A frequency domain induction system for locating subsurface objects, comprising:
   a movable cart;
   an array attached to said movable cart and including two or more spatially separated receiver/transmitter pairs;
   transmission circuitry adapted to transmit time-harmonic electromagnetic fields through said transmitters;
   reception circuitry adapted to receive magnetic fields induced by said time-harmonic electromagnetic fields;
   analysis software capable of analyzing said magnetic fields to detect the presence of said subsurface objects.

* * * * *